United States Patent
Hong et al.

(10) Patent No.: US 6,714,786 B2
(45) Date of Patent: Mar. 30, 2004

(54) METHOD FOR PREVENTING FORWARD TELECOMMUNICATION DISTORTION IN SOFT HANDOFF

(75) Inventors: Sung Hyuck Hong, Kyonggi-do (KR); Se Ho Cheon, Inchon-shi (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 09/814,158

(22) Filed: Mar. 22, 2001

(65) Prior Publication Data

US 2002/0137516 A1 Sep. 26, 2002

(51) Int. Cl.[7] ................................................ H04Q 7/38
(52) U.S. Cl. ........................................ 455/442; 455/438
(58) Field of Search .................................. 455/437, 438, 455/439, 442; 370/331, 332, 335, 342

(56) References Cited

U.S. PATENT DOCUMENTS 5,781,861 A * 7/1998 Kang et al. ................. 455/442
6,070,075 A * 5/2000 Kim ............................ 455/437
6,449,481 B1 * 9/2002 Kwon et al. ................. 455/437

\* cited by examiner

*Primary Examiner*—Lee Nguyen
*Assistant Examiner*—Sanh Phu
(74) *Attorney, Agent, or Firm*—Fleshner & Kim, LLP

(57) ABSTRACT

A mobile telecommunication system and a method of preventing forward telecommunication distortion in soft handoff improve the quality of telephonic communications in a CDMA telecommunication system. Accordingly, the mobile telecommunication system includes the steps of having an arbitrary base station verify a data transmitted from a base station controller, having the base station judge whether ADD handoff of a mobile station in progress or not if the data is not verified, and having the base station transmit a null data including no information instead of the data to the mobile station provided that the ADD handoff of the mobile station is not in progress.

4 Claims, 2 Drawing Sheets base station controller

METHOD FOR PREVENTING FORWARD TELECOMMUNICATION DISTORTION IN SOFT HANDOFF

BACKGROUND OF THE INVENTION

1. Field of the Invention

The present invention relates to a mobile telecommunication system, more particularly, to a method of preventing forward telecommunication distortion in soft handoff for improving the quality of telephonic communications in a CDMA telecommunication system.

2. Background of the Related Art

In a general CDMA mobile telecommunication system, when a mobile station comes out of a previous serving base station and then enters into a new service area of a new base station, a call is handed off to maintain a radio link between the mobile station and the base station.

In this case, the handoff is a unique phenomenon due to the mobility of the mobile station. Namely, the mobile station keeps on searching signal strength of the serving base station providing the present service as well as another signal strength of the circumferential base stations. Then, the mobile station hands off the call to the optimal target base station to maintain the present progressing telecommunication by comparing the signal strengths of the searched base stations one another.

As a result, the mobile station maintains the telecommunication through a newly-secured communication channel by carrying out the handoff, thereby providing an excellent telephonic communication quality.

One of the handoff types in CDMA mobile telecommunication systems is a soft handoff providing a continuous call without telecommunication disconnection.

The soft handoff is carried out between a specific mobile station and a plurality of base stations around the mobile station allotted with the same frequency.

Figure 1:
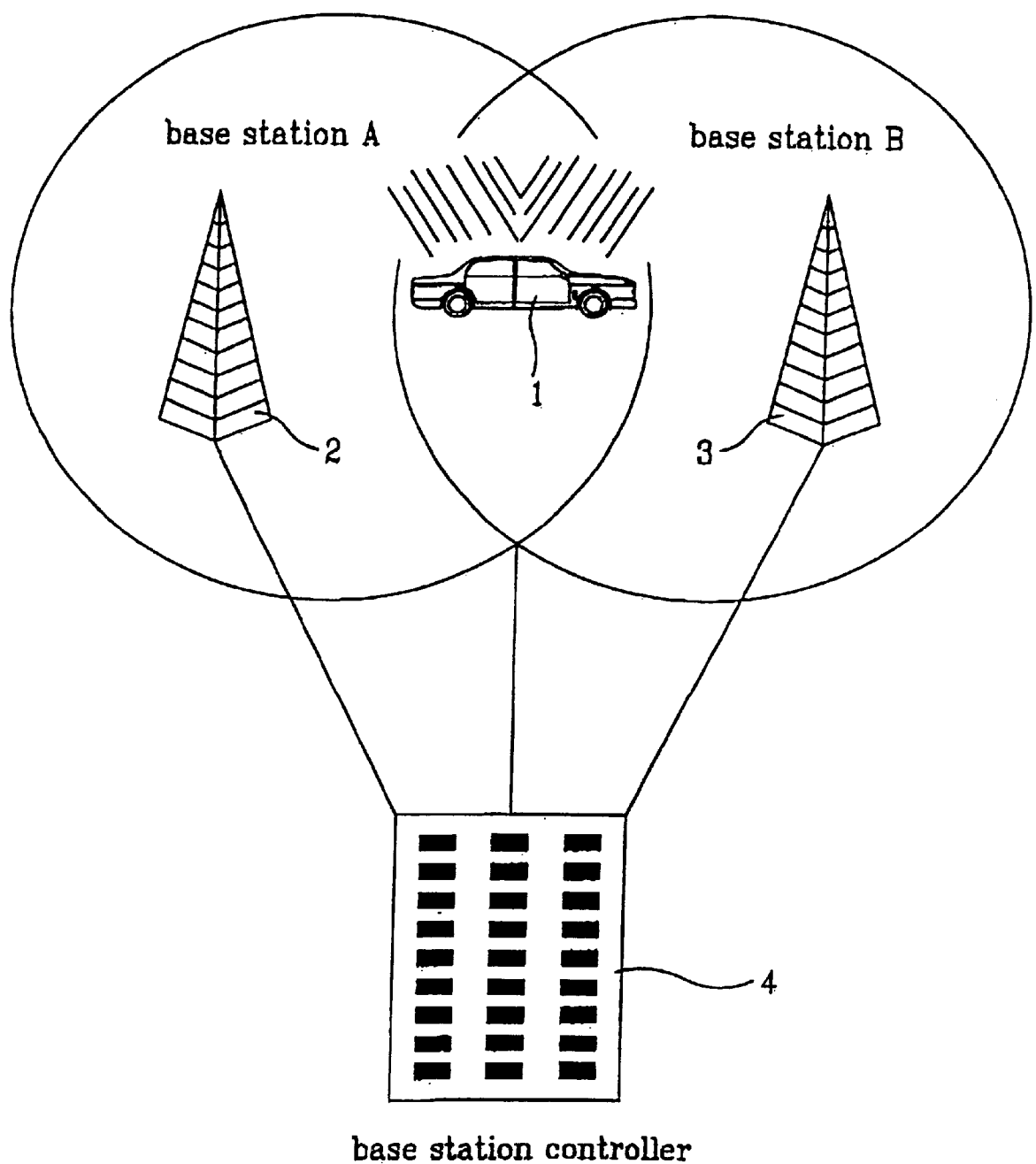

FIG. 1 shows a partial construction of a CDMA mobile telecommunication system. And, a general handoff will be explained by referring to FIG. 1.

CDMA channels allotted with the same frequency are used between a mobile station 1 and the respective base stations 2 and 3. When the CDMA channels are set up between the mobile station 1 and the respective base stations 2 and 3, the channels generate different offsets one another.

The mobile station 1 keeps on tracing a pilot channel in various CDMA channels, while the respective base stations 2 and 3 transmit pilot signals through the pilot channel having different sequence offsets to the mobile station 1.

After having measured the strengths of the pilot signals received from the base station A 2 which is a presently-serving base station and the other base station B 3 which is a circumferential base station, the mobile station 1 compares the measured strength of the pilot signal to the previously established critical values such as an ADD threshold and a DROP threshold.

The critical value of the ADD threshold is the minimum strength of the base station signal enough to maintain an available communication channel, while that of the DROP threshold is a maximum strength of the base station signal required for releasing an unavailable communication channel.

The mobile station 1 transfers a PSMM(pilot strength measurement message) to the base station A 2 provided that the pilot signal strength of the measured base station A 2 is dropped under the DROP threshold or becomes larger than the ADD threshold.

On the other hand, the mobile station 1 transfers a pilot strength measurement message including the information of the pilot signal strength of the base station B 3 to the other base station A 2 provided that the pilot signal strength of the base station B 3 is over the ADD threshold.

Then, the base station A 2 reports the received pilot strength measurement message to a base station controller (BSC) 4. And, a call control processor(CCP) (not shown in the drawing) installed in the base station controller 4 analyses the received pilot strength measurement message.

As the call control processor directs a soft handoff against the mobile station 1 to the base station A 2 and the other base station B 3 in accordance with the result of analysing the received signal strength measurement message, a communication channel between the mobile station 1 and the base station A 2 is maintained but a new communication channel is established between the mobile station 1 and the other base station B 3 because of an ADD handoff.

When the mobile station 1 moves into an area of the other base station B 3, as shown in FIG. 1, the call established between the mobile station 1 and the base station A 2 will be handed off to the base station B 3. Thus, the communication channel established between the mobile station 1 and the base station A 2 is released by a DROP handoff but the other communication channel between the mobile station 1 and the other base station B 3 is maintained to provide a continuous telecommunication. In this case, the other base station B 3 is a target base station in soft handoff of the mobile station 1.

The above-explained procedure of the soft handoff is carried out bidirectionally in accordance with the handoff message transfer based on the pilot signal strength of a forward direction link. Thus, telecommunication quality is more improved by the soft hand-off in CDMA mobile telecommunication systems.

However, the base station failing to receive a data frame from a base station controller due to the instability of a communication link transmits a null traffic frame instead of the data frame, which is for the corresponding base station to maintain its link with the mobile station continuously. Thus, the null traffic frame is transmitted with a minimum data rate including meaningless informations.

When the mobile station is busy with the respective base stations by occupying CDMA channels of different offsets by the ADD handoff in the above-explained soft handoff procedure, the null traffic frame is transmitted to the mobile station in the related art even though the corresponding base station is unable to receive the data frame from the base station controller due to a unstable communication link between the base station controller and the base station.

According to the transmission of the null traffic frame, the mobile station combines the data frame received from the base station having a normal link with the base station controller with the null data frame received from the other base station having an abnormal link with the base station controller. Then, the mobile station decodes the frames. Thus, the received data is distorted when the normally-received data frame is combined with the abnormally-received null data frame.

As a result, when the mobile station receives and decodes the distorted data, call drops may be generated.

SUMMARY OF THE INVENTION

Accordingly, the present invention is directed to a method of preventing forward telecommunication distortion in soft handoff that substantially obviates one or more of the problems due to limitations and disadvantages of the related art.

The objective of the present invention is to provide a method of preventing forward telecommunication distortion in soft handoff by making a base station, which fails to receive a data frame from a base station controller due to unstable communication link, not to transmit a null traffic frame to a mobile station when the mobile station is busy with the respective base stations by occupying CDMA channels of different offsets through an ADD handoff in a soft handoff procedure.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes the steps of having an arbitrary base station verify a data transmitted from a base station controller, having the base station judge whether ADD handoff of a mobile station is in progress or not if the data is not verified, and having the base station transmit a null data including no information instead of the data to the mobile station if the ADD handoff of the mobile station is not in progress.

In this case, the mobile station is connected to at least one base station. And, when data transmitted from the base station controller to an arbitrary base station are verified, the corresponding mobile station decodes the data by using only the data transferred from the base station to the mobile station.

However, when the ADD handoff of the mobile station is in progress, the base station does not transmit null data including no information to the mobile station.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

Figure 2:
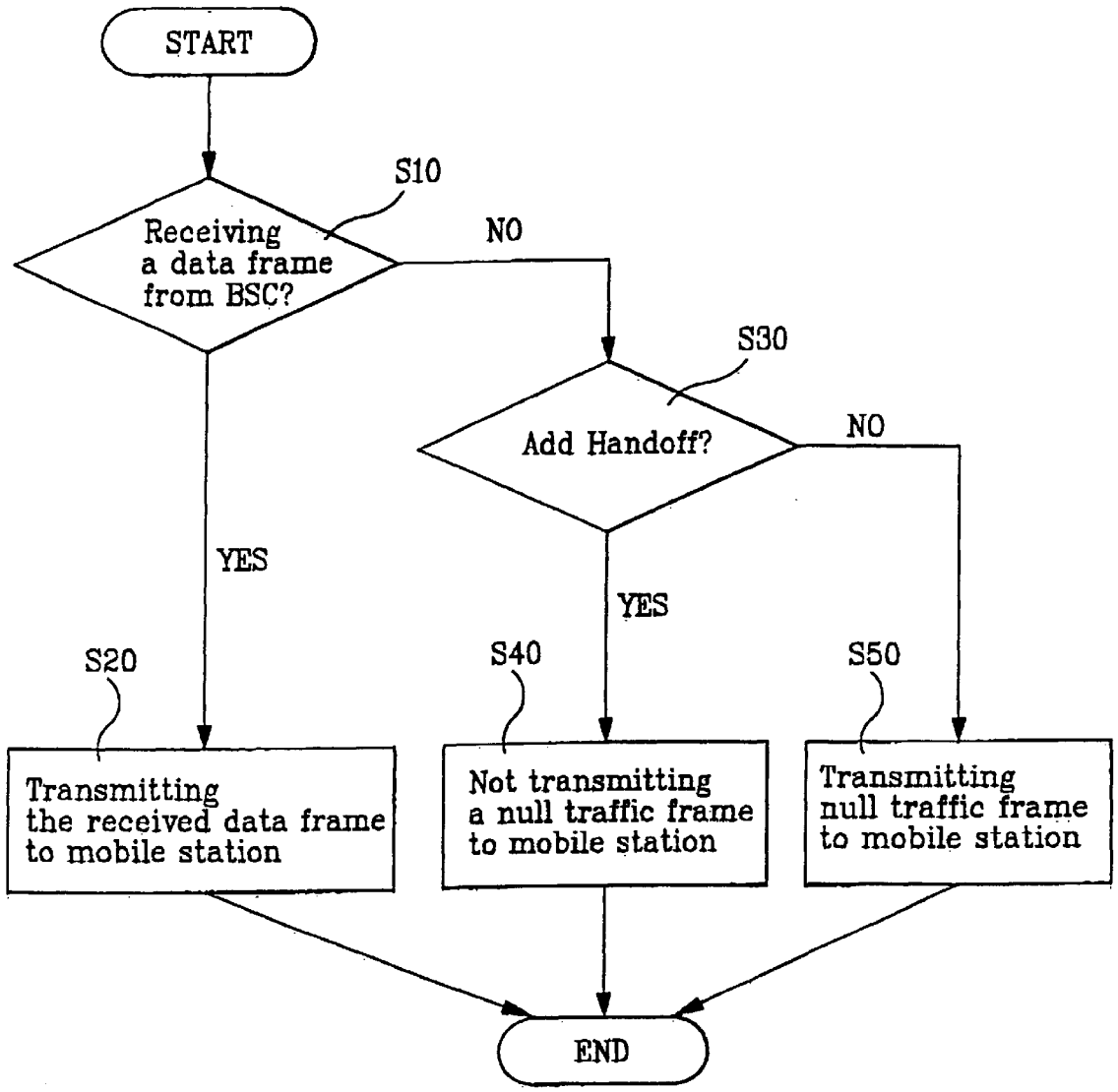

In the drawings:

FIG. 1 shows a partial schematic construction of a CDMA mobile telecommunication system; and FIG. 2 shows a flow chart of a procedure of preventing forward telecommunication distortion in soft handoff according to the present invention.

DETAILED DESCRIPTION OF THE PREFERRED EMBODIMENTS

Reference will now be made in detail to the preferred embodiments of the present invention, examples of which are illustrated in the accompanying drawings.

When a mobile station is busy by occupying CDMA channels of different offsets with various base stations by the ADD handoff in a soft handoff procedure, the present invention is applied to the case that the corresponding base station fails to receive a data frame from a base station controller due to an unstable telecommunication link between the base station controller and one of the base stations.

Accordingly, the present invention prevents the base station, which fails to receive the data frame from the base station controller, from transmitting a null traffic frame to the mobile station, and makes the mobile station receive normal data frames only from other base stations.

In order to explain a process of preventing traffic distortion in soft handoff according to the present invention, the CDMA mobile telecommunication system in FIG. 1 is referred to.

In the present invention, a base station A 2 is a serving base station of a present mobile station 1 and the respective base stations 2 and 3 are classified into an active set, candidate set and neighbor set in accordance with signal strengths.

The base station list is constituted with priority in order such as the active set, candidate set and neighbor set in soft handoff.

It is assumed that the base station B 3 belongs in the neighbor set or candidate set of the base station list.

As is the case with the related art, the ADD threshold and DROP threshold are used in the present invention. In this case, the ADD threshold is the minimum base station signal strength enough to maintain available communication channels between the mobile station 1 and the base stations 2 and 3, while the DROP threshold is the maximum base station signal strength required for releasing unavailable communication channels between the mobile station 1 and the base stations 2 and 3.

Under the above condition, CDMA channels allotted with the same frequency are used between the mobile station 1 and the respective base stations 2 and 3. When the CDMA channels are set up between the mobile station 1 and the respective base stations 2 and 3, the channels have different offsets one another.

The mobile station 1 keeps on tracing a pilot channel in various CDMA channels, while the respective base stations 2 and 3 transmit pilot signals through the pilot channel having different sequence offsets to the mobile station 1.

After having measured respectively the strengths of the pilot signals received from the base station A 2 which is a presently-serving base station and the other base station B 3 which is a circumferential base station, the mobile station 1 compares the measured strength of the pilot signal to the previously established critical values such as ADD threshold and DROP threshold.

The mobile station 1 transfers a PSMM(pilot strength measurement message to the base station A 2 provided that the pilot signal strength of the measured base station A 2 is dropped under the DROP threshold or becomes larger than the ADD threshold.

Otherwise, the mobile station 1 transfers a signal strength message including the information of the pilot signal strength of the base station B 3 to the other base station A 2 provided that the pilot signal strength of the base station B 3 is only over the ADD threshold.

Then, the base station A 2 reports the received signal strength measurement message to a base station controller (BSC) 4. And, a call control processor(CCP) (not shown in the drawing) installed in the base station controller 4 analyses the received signal strength measurement message.

As the call control processor(not shown in the drawing) directs a soft handoff of the mobile station 1 to the base station A 2 and the other base station B 3 in accordance with the result of analyzing the received signal strength measurement message, a communication channel between the mobile station 1 and the base station A 2 is maintained but a new communication channel is established between the mobile station 1 and the other base station B 3 by ADD handoff.

Thus, when the mobile station is busy by occupying CDMA channels of different offsets with the respective base stations by ADD handoff, the channel element in the respective base stations 2 and 3 judge the existence or non-existence of the data frame received from the base station controller 4 by every 20 ms.

If it is judged that the received data frame exists, the corresponding base station processes the received data frame normally and transfers it to the mobile station 1. On the other hand, the other base station failing to receive the data frame due to the unstable communication link between the base station controller and the base station itself does not transmit a null traffic frame to the mobile station 1.

Accordingly, the mobile station 1 receives and decodes the data frame from the base station having a normal link only.

In the above description, a method of preventing forward telecommunication distortion in soft handoff is briefly explained, which will be specifically explained in the following description.

FIG. 2 shows a flow chart of a procedure of preventing forward telecommunication distortion in soft handoff according to the present invention.

Referring to FIG. 2, a call control processor, which is busy, in a base station judges every 20 ms whether a data frame received from a Selector/Vocoder Card(SVC) of a base station controller exists or not[S10].

In order for the corresponding base station to maintain its link with the mobile station continuously, the base station failing to receive a data frame from the base station controller due to the instability of a communication link transmits a null traffic frame instead of the data frame. Generally, the null traffic frame is transmitted with a minimum data rate including meaningless informations.

If it is judged that there exists the data frame transferred from the selector/vocoder card(SVC) of the base station controller to the corresponding base station, the call control processor processes the received data frame normally and transmits it to the mobile station[S20].

If it is judged that there exists no data frame transferred from the selector/vocoder card(SVC) of the base station controller to the corresponding base station, it is judged whether ADD handoff in soft handoff of the busy mobile station is progressed or not[S30].

In this case, a null traffic frame is not transmitted to the mobile station provided that ADD handoff is in progress to the busy mobile station[S40], which is because the mobile station in ADD handoff can receive the data frame through other channels between the mobile station and the other base stations.

Otherwise, the base station transmits a null traffic frame including meaningless information instead of the data frame to the mobile station at a minimum data rate such as ⅛ rate to maintain the link with the mobile station continuously provided that ADD handoff is not in progress to the busy mobile station[S50].

Accordingly, during ADD handoff in a busy mobile station, the present invention enables to prevent forward telecommunication distortion occurred when a normally-received data frame is combined with an abnormally-received null data frame by making a base station, which fails to receive a data frame from a base station controller due to unstable communication link, not to transmit a null traffic frame instead of a data frame to the mobile station.

It will be apparent to those skilled in the art that various modifications and variations can be made in a method of preventing forward telecommunication distortion in soft handoff the present invention without departing from the spirit or scope of the inventions. Thus, it is intended that the present invention cover the modifications and variations of this invention provided they come within the scope of the appended claims and equivalents.

What is claimed is:

1. A method of preventing forward telecommunication distortion in soft handoff, comprising the steps of:

having an arbitrary base station verify a data transmitted from a base station controller;

having the base station judge whether ADD handoff of a mobile station in progress or not if the data is not verified; and having the base station transmit a null data including no information instead of the data to the mobile station if the ADD handoff of the mobile station is not in progress.

2. The method of claim 1, wherein the base station does not transfer the null data including no information to the mobile station when the ADD handoff of the mobile station is in progress.

3. The method of claim 1, wherein the mobile station is connected with a communication link of a t least one base station.

4. The method of claim 1, wherein the data is transferred from the base station to the mobile station and the corresponding mobile station carries out decoding using the data only if the data transferred from the base station controller to the arbitrary base station is verified.

* * * * *